No. 668,821. Patented Feb. 26, 1901.
A. J. LONG.
FRUIT PITTING IMPLEMENT.
(Application filed Nov. 15, 1900.)
(No Model.)
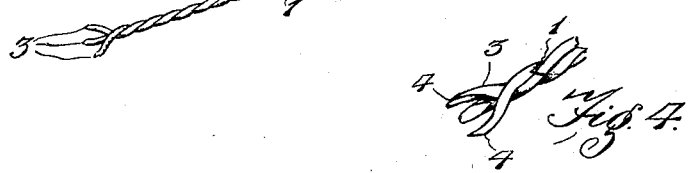
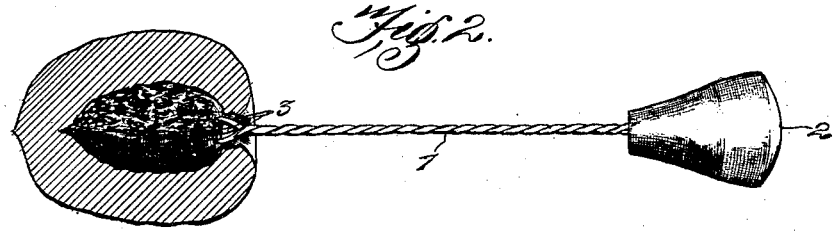
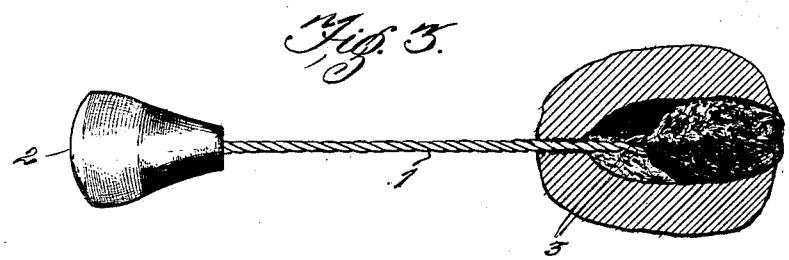
Witnesses
Anna J. Long, Inventor
Attorneys

UNITED STATES PATENT OFFICE.

ANNA J. LONG, OF CADIZ, OHIO, ASSIGNOR OF ONE-HALF TO KATHERINE J. REESE, OF SAME PLACE.

FRUIT-PITTING IMPLEMENT.

SPECIFICATION forming part of Letters Patent No. 668,821, dated February 26, 1901.

Application filed November 15, 1900. Serial No. 36,640. (No model.)

*To all whom it may concern:*

Be it known that I, ANNA J. LONG, a citizen of the United States, residing at Cadiz, in the county of Harrison and State of Ohio, have invented a new and useful Fruit-Pitting Implement, of which the following is a specification.

This invention relates to fruit pitting or stoning devices, and has for its object to provide an improved hand-operated implement of this character which is especially designed for removing peach-stones so as to leave the peach in its whole state in order that it may be preserved or cooked without being cut up into pieces.

With this object in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a fruit-pitting implement constructed in accordance with the present invention. Fig. 2 is a sectional elevation showing the implement in the first step of its operation. Fig. 3 is a similar view showing the final step as the pit is being removed from the fruit. Fig. 4 is a detail enlarged perspective view of the pronged or cutting end of the implement.

Like characters of reference designate corresponding parts in all of the figures of the drawings.

Referring particularly to Fig. 1 of the drawings, it will be seen that the present implement comprises a substantially long and straight shank 1, which is provided at one end with a handle 2, of suitable shape to be held in the palm of the hand. At the opposite end of the shank there are provided a plurality of divergent prongs 3, which are arranged at substantially equal intervals around the margin of the shank and also project in advance thereof.

As best indicated in Fig. 4 of the drawings, it will be seen that each prong has its outer extremity beveled, as at 4, upon its outer side, so as to form a transverse chisel end, while the inner side of the prong is flattened for the greater part of its length, so as to form opposite longitudinal sharp cutting or knife edges.

It is preferable to form the shank of the implement from three strands of stiff wire, which are tightly twisted together, so as to form a straight stiff shank, the outer terminals of the wires being bent or inclined outwardly, so as to form the prongs.

In using the implement to remove a pit or stone from a fruit the prongs are thrust into the stem end thereof, as shown in Fig. 2, after which the implement is rotated upon its longitudinal axis, so as to free the stem end portion of the fruit from the stone or pit thereof, after which the implement is withdrawn and thrust into the blossom end of the fruit, and by a slight push the prongs are brought into contact with the adjacent end of the pit, and the latter is forced longitudinally outward through the stem end of the fruit. It will now be understood that the knife-edges of the prongs cut the stem end of the fruit, when the implement is rotated, so as to make an opening for the exit of the stone or pit and also to free the stem end thereof from the body of the fruit. Through this operation of the implement the stone or pit may be removed without cutting the fruit into pieces, thereby preserving it in its whole condition, which is the desirable state for preserving.

From the foregoing description it will be seen that the present invention provides a simple and conveniently-operated implement which is designed to be manipulated by one hand, while the other hand holds the peach or other fruit from which the stone or pit is to be removed. No special skill or experience is required, as a few trials will give the operator complete control of the implement, and the fruit may then be pitted or stoned as fast as the implement can be applied to the same.

What is claimed is—

1. As a new article of manufacture, a fruit-pitting implement, comprising a straight shank, having a handle at one terminal, and a plurality of divergent prongs at the opposite terminal, said prongs having corresponding longitudinal cutting edges, the entire implement being formed for rotation upon its longitudinal axis, and the cutting edges of the prongs being arranged to form an opening in the fruit for the insertion of the implement, when the latter is being rotated.

2. As a new article of manufacture, a fruit-pitting implement, comprising a straight shank, which is formed by a plurality of intertwisted strands, of which the corresponding ends at one terminal of the shank are formed into divergent prongs having opposite longitudinal cutting edges, and chisel-edge outer terminals, and a handle fixed to the opposite terminal of the shank.

In testimony that I claim the foregoing as my own I have hereto affixed my signature in the presence of two witnesses.

ANNA J. LONG.

Witnesses:
RUPERT R. BEETHAM,
WILLIAM T. PERRY.